(12) United States Patent
Sasaki et al.

(10) Patent No.: US 11,076,108 B2
(45) Date of Patent: Jul. 27, 2021

(54) IMAGE CAPTURING APPARATUS AND CONTROL METHOD THEREOF

(71) Applicant: CANON KABUSHIKI KAISHA, Tokyo (JP)

(72) Inventors: Ken Sasaki, Tokyo (JP); Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/387,648

(22) Filed: Apr. 18, 2019

(65) Prior Publication Data

US 2019/0327424 A1 Oct. 24, 2019

(30) Foreign Application Priority Data

Apr. 23, 2018 (JP) .............................. JP2018-082459

(51) Int. Cl.
*H04N 5/243* (2006.01)

(52) U.S. Cl.
CPC .................................. *H04N 5/243* (2013.01)

(58) Field of Classification Search
CPC .... H04N 5/243; H04N 5/37455; H04N 5/353; H04N 5/213; H04N 5/2253; G01J 2001/442
See application file for complete search history.

(56) References Cited

U.S. PATENT DOCUMENTS

| 9,596,421 | B1 | 3/2017 | Itzler |
| 10,012,534 | B2* | 7/2018 | Andreou ............... H01L 31/107 |
| 2006/0175529 | A1* | 8/2006 | Harmon .......... H01L 31/035236 |
| | | | 250/207 |
| 2011/0266420 | A1 | 11/2011 | Eldesouki et al. |
| 2018/0323229 | A1* | 11/2018 | Nouri .................... G01J 1/4228 |

FOREIGN PATENT DOCUMENTS

| JP | 2014-081253 A | 5/2014 |
| WO | 2016/003451 A1 | 1/2016 |

OTHER PUBLICATIONS

The above documents were cited in a European Search Report dated Sep. 26, 2019, which is enclosed, that issued in the corresponding European Patent Application No. 19165461.5.

\* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An image capturing apparatus comprises an image sensor including a plurality of pixels, each pixel being configured to include a sensor unit that outputs a signal pulse in response to a single photon being received, and a counter that counts the signal pulses and outputs a count value; and a control unit configured to control a pulsewidth of the signal pulses in accordance with shooting conditions of the image capturing apparatus or a state of the image capturing apparatus.

12 Claims, 11 Drawing Sheets

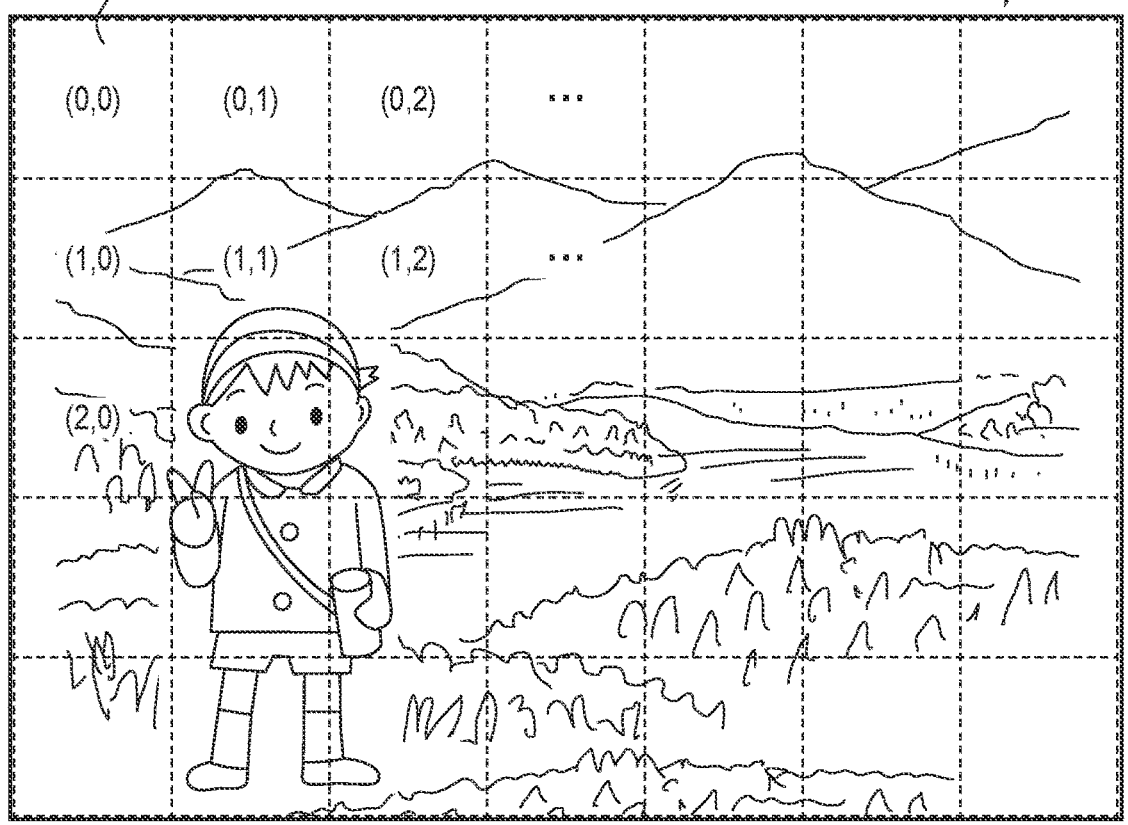

IMAGE CAPTURING APPARATUS AND CONTROL METHOD THEREOF

BACKGROUND OF THE INVENTION

Field of the Invention

The present invention relates to image capturing apparatuses and control methods thereof.

Description of the Related Art

Light-receiving elements that enable single photons to be detected by using avalanche photodiodes ("APDs" hereinafter) have been known for some time. When a reverse-bias voltage greater than the breakdown voltage is applied to an avalanche photodiode, a carrier generated by a single photon being incident causes avalanche multiplication, which produces a large current. The single photon can be detected on the basis of this current. In this specification, such APDs will be referred to as Single Photon Avalanche Diodes (SPADs).

Linearity is a known issue with light-receiving elements that use SPADs. One cause of a worsening in linearity arises in high-illuminance states, i.e., in states where the amount of received light per unit of time is high. Here, multiple signals pulses overlapping result in the count value of the photons being lower than the actual number of incident photons.

In response to such an issue, the light-receiving element disclosed in Japanese Patent Laid-Open No. 2014-81253 integrates the widths of signal pulses produced by SPADs, and obtains an output that always increases monotonically as the amount of incident light increases. To that end, the configuration of the light-receiving element according to Japanese Patent Laid-Open No. 2014-81253 includes voltage-current transform means, which transform a voltage signal into a current signal, in each of the pixels, and furthermore includes integration means that integrate the current signals of a plurality of pixels. Through this configuration, the light-receiving element according to Japanese Patent Laid-Open No. 2014-81253 reduces a worsening in linearity resulting from the above-described causes.

Incidentally, in SPADs, if a carrier captured in a crystal defect at the time of avalanche multiplication is released after time has passed, a "false" signal pulse, known as an afterpulse, is produced when the next avalanche multiplication occurs. If this afterpulse is mistakenly counted, the count value will end up higher than the actual number of photons incident on the SPAD, which worsens the linearity. The light-receiving element of Japanese Patent Laid-Open No. 2014-81253 has not been able to handle a worsening in linearity caused by such afterpulsing.

SUMMARY OF THE INVENTION

Having been achieved in light of the above-described issues, the present invention further improves linearity in an image capturing apparatus that uses a single-photon light-receiving element.

According a first aspect of the present invention, there is provided an image capturing apparatus comprising: an image sensor including a plurality of pixels, each pixel being configured to include a sensor unit that outputs a signal pulse in response to a single photon being received, and a counter that counts the signal pulses and outputs a count value; and at least one processor or circuit configured to function as a control unit configured to control a pulsewidth of the signal pulses in accordance with shooting conditions of the image capturing apparatus or a state of the image capturing apparatus.

According to a second aspect of the present invention, there is provided an image capturing apparatus comprising: an image sensor including a plurality of pixels, each pixel being configured to include a sensor unit that outputs a signal pulse in response to a single photon being received, a counter that counts the signal pulses and outputs a count value, and a counter controller that controls the counter to not count signal pulses in a predetermined period after the occurrence of the signal pulse; and at least one processor or circuit configured to function as a control unit configured to control the predetermined period in accordance with shooting conditions of the image capturing apparatus or a state of the image capturing apparatus.

According to a third aspect of the present invention, there is provided a method for controlling an image capturing apparatus, the image capturing apparatus comprising: an image sensor including a plurality of pixels, each pixel being configured to include a sensor unit that outputs a signal pulse in response to a single photon being received, and a counter that counts the signal pulses and outputs a count value, and the method comprising: controlling a pulsewidth of the signal pulse in accordance with shooting conditions of the image capturing apparatus or a state of the image capturing apparatus.

According to a fourth aspect of the present invention, there is provided a method for controlling an image capturing apparatus, the image capturing apparatus comprising: an image sensor including a plurality of pixels, each pixel being configured to include a sensor unit that outputs a signal pulse in response to a single photon being received, a counter that counts the signal pulses and outputs a count value, and a counter controller that controls the counter to not count signal pulses in a predetermined period after the occurrence of the signal pulse, and the method comprising: controlling the predetermined period in accordance with shooting conditions of the image capturing apparatus or a state of the image capturing apparatus.

Further features of the present invention will become apparent from the following description of exemplary embodiments with reference to the attached drawings.

BRIEF DESCRIPTION OF THE DRAWINGS

FIG. 11 is a diagram illustrating a method for dividing an image capturing region according to a first variation on the second embodiment.

FIG. 12 is a diagram illustrating a color filter arrangement pattern according to a second variation on the second embodiment.

DESCRIPTION OF THE EMBODIMENTS

Hereinafter, embodiments of the present invention will be described in detail with reference to the appended drawings. In the following descriptions, high level and low level for digital signal pulses will be also referred to as "high" and "low", respectively.

First Embodiment

A first embodiment of the present invention will be described hereinafter with reference to FIGS. 1 through 8.

Figure 1:
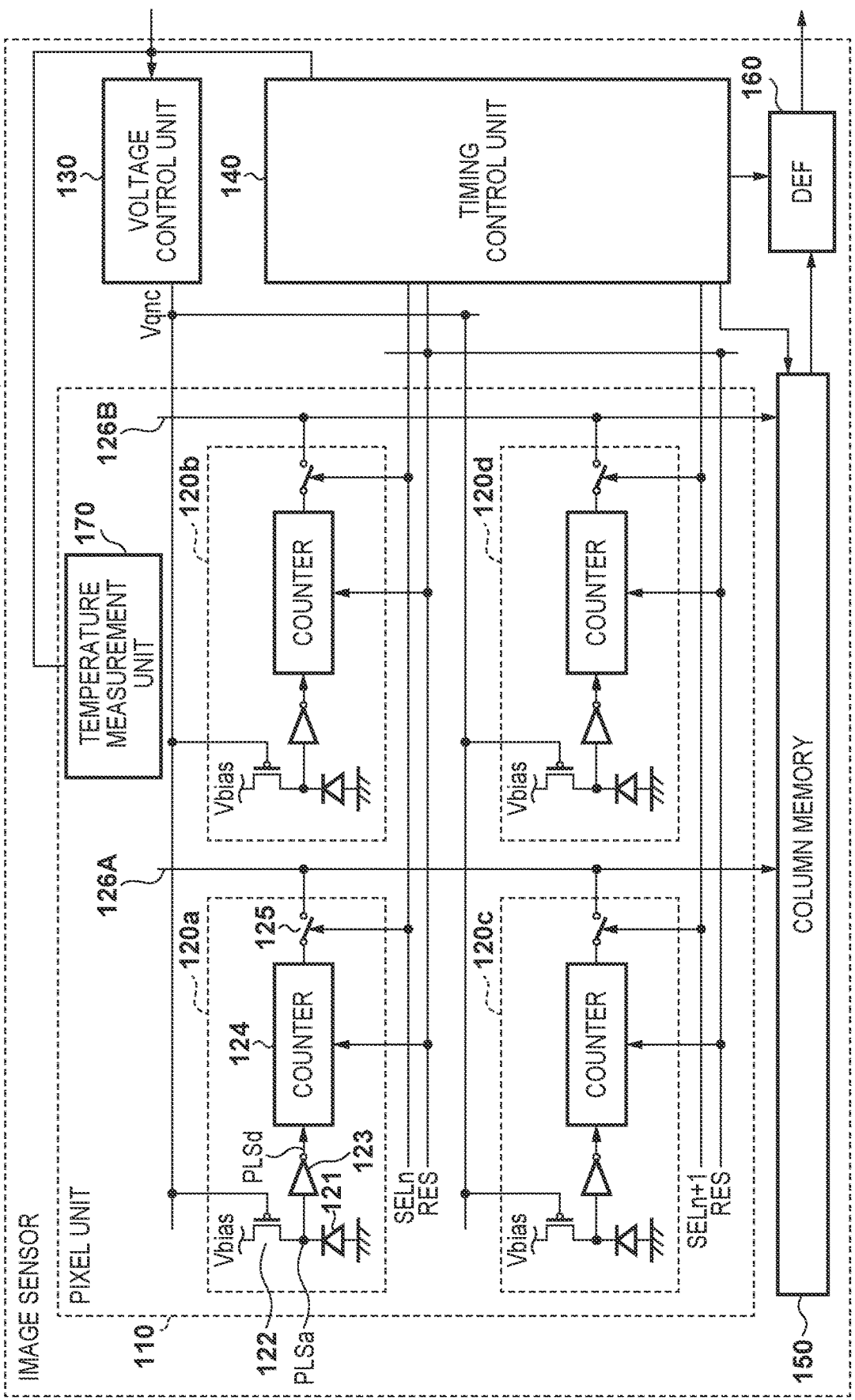
FIG. 1 is a diagram illustrating the configuration of an image sensor according to a first embodiment of the present invention.

FIG. 1 is a diagram illustrating the configuration of an image sensor 100 according to the first embodiment. In FIG. 1, the image sensor 100 includes a pixel unit 110, a voltage control unit 130, a timing control unit (also referred to as "TG" hereinafter) 140, a column memory 150, and a digital front-end (also referred to as "DFE" hereinafter) 160.

The pixel unit 110 includes four pixels 120a to 120d, column output lines 126A and 1263, and a temperature measurement unit 170. Although FIG. 1 illustrates the four pixels 120a to 120d to make the descriptions easier to understand, in reality, many more pixels 120 are arranged in a matrix to constitute the pixel unit 110. Additionally, although FIG. 1 illustrates two column output lines 126A and 126B to make the descriptions easier to understand, in reality, many more column output lines 126 are provided for each column of the pixel unit 110 configured as a matrix.

Each pixel 120 includes a SPAD (a sensor unit) 121, a quenching element 122, an inverter 123, a counter 124, and a readout switch 125. The SPAD 121 is an avalanche photodiode operated in Geiger-mode to detect single photons. "Geiger-mode" is an APD operating mode in which the APD is operated by applying a reverse-bias voltage greater than the breakdown voltage. In the SPAD 121, when a voltage Vbias greater than a breakdown voltage Vbr is applied to the cathode and the diode enters Geiger-mode, a carrier generated when a single photon is incident produces avalanche multiplication, which in turn produces a large current. Here, the voltage Vbias is +20 V, for example.

The quenching element 122 is a resistance element for stopping the avalanche multiplication in the SPAD 121. In the present embodiment, the resistance component of a P-type MOS transistor ("PMOS" hereinafter) is used as the quenching element 122. The configuration is such that a voltage Vqnc is applied to the gate terminal of the PMOS of the quenching element 122. The image sensor 100 of the present embodiment has a characteristic in that the voltage control unit 130 changes the value of the voltage Vqnc in accordance with shooting conditions of an image capturing apparatus 200, which will be described later. When a PMOS is used for the quenching element 122, as in the pixel 120, the resistance component of the quenching element changes by decreasing as the value of the voltage Vqnc decreases, and increasing as the value of the voltage Vqnc increases. Note, however, that an N-type MOS transistor ("NMOS" hereinafter) can also be used as the quenching element 122. When an NMOS is used for the quenching element 122, the resistance component of the quenching element changes so as to decrease as Vqnc increases, and increase as Vqnc decreases. Although the following descriptions are based on a configuration in which a PMOS is used for the quenching element, the effects of the present embodiment can be obtained when using an NMOS too, by changing the control values of the voltage Vqnc.

When a photon is incident on the SPAD 121 and a current is generated by avalanche multiplication, a voltage drop occurs in the quenching element 122. When, due to this voltage drop, the voltage at the cathode of the SPAD 121 falls from the voltage Vbias to below the breakdown voltage Vbr, the avalanche multiplication stops. The voltage returns to the voltage Vbias when the cathode of the SPAD 121 is charged through the quenching element 122. In this manner, the SPAD 121 can cause a single voltage signal pulse to be generated at the cathode (i.e., a node PLSa illustrated in FIG. 1) in response to a single photon being incident. At this time, the width of the voltage signal pulse differs depending on the magnitude of the resistance value in the quenching element 122. In other words, by changing the voltage Vqnc, the voltage control unit 130 can change the width of the voltage signal pulse generated at the node PLSa in response to a photon being incident.

The inverter 123, which serves as a buffer stage, takes the voltage signal pulse generated by the SPAD 121 as described earlier as an input, and outputs a waveform-shaped signal pulse to the output terminal thereof (i.e., the node PLSd illustrated in FIG. 1). Of course, the width of the waveform-shaped signal pulse arising at the node PLSd differs depending on the voltage Vqnc.

The counter 124 takes the signal pulse output by the inverter 123 as an input and counts the rising edge of the signal pulse. The inverter is used as a buffer stage because the configuration is such that the counter counts the rising edges. If a buffer that does not invert the polarity is used, the counter 124 may instead count the falling edge of the signal pulse output by the buffer.

The counter 124 is configured to be capable of counting a number of pulses corresponding to 16 bits, for example (65535 counts, in decimals). In the following descriptions, "count value" refers to the value counted by the counter 124. In the counter 124, an operation for resetting the count value and the starting timing of the count operations are controlled by a signal pulse RES output by the TG 140.

The readout switch 125 turns on in response to a signal pulse SELn (where n indicates the row number in the pixel arrangement), which is output in row-by-row sequence by the TG 140, changing from low to high, whereupon the count value held in the counter 124 is written into the column memory 150 via the column output lines 126. As described earlier, the TG 140 sequentially selects rows of the pixels arranged in a matrix and outputs the signal pulse SELn on a row-by-row basis. Additionally, the TG 140 outputs the signal pulse RES, which controls the operation for resetting the count value of the counter 124 and the starting timing of the count operations.

In the column memory 150, the count values of the pixels 120 in the row selected by the TG 140 with the signal pulse SELn are written via the column output lines 126, and the count values are held for each of the columns. Additionally, as a result of the TG 140 sequentially selecting the count values of the pixels 120, held in the column memory 150, on a column-by-column basis, the column memory 150 sequentially outputs the count values of the pixels 120 to the DFE 160. The DFE 160 applies digital processing, such as gain processing and signal rearrangement, to the count values of the pixels 120 output from the column memory 150, and then outputs those signals to the exterior of the image sensor 100.

Figure 2:
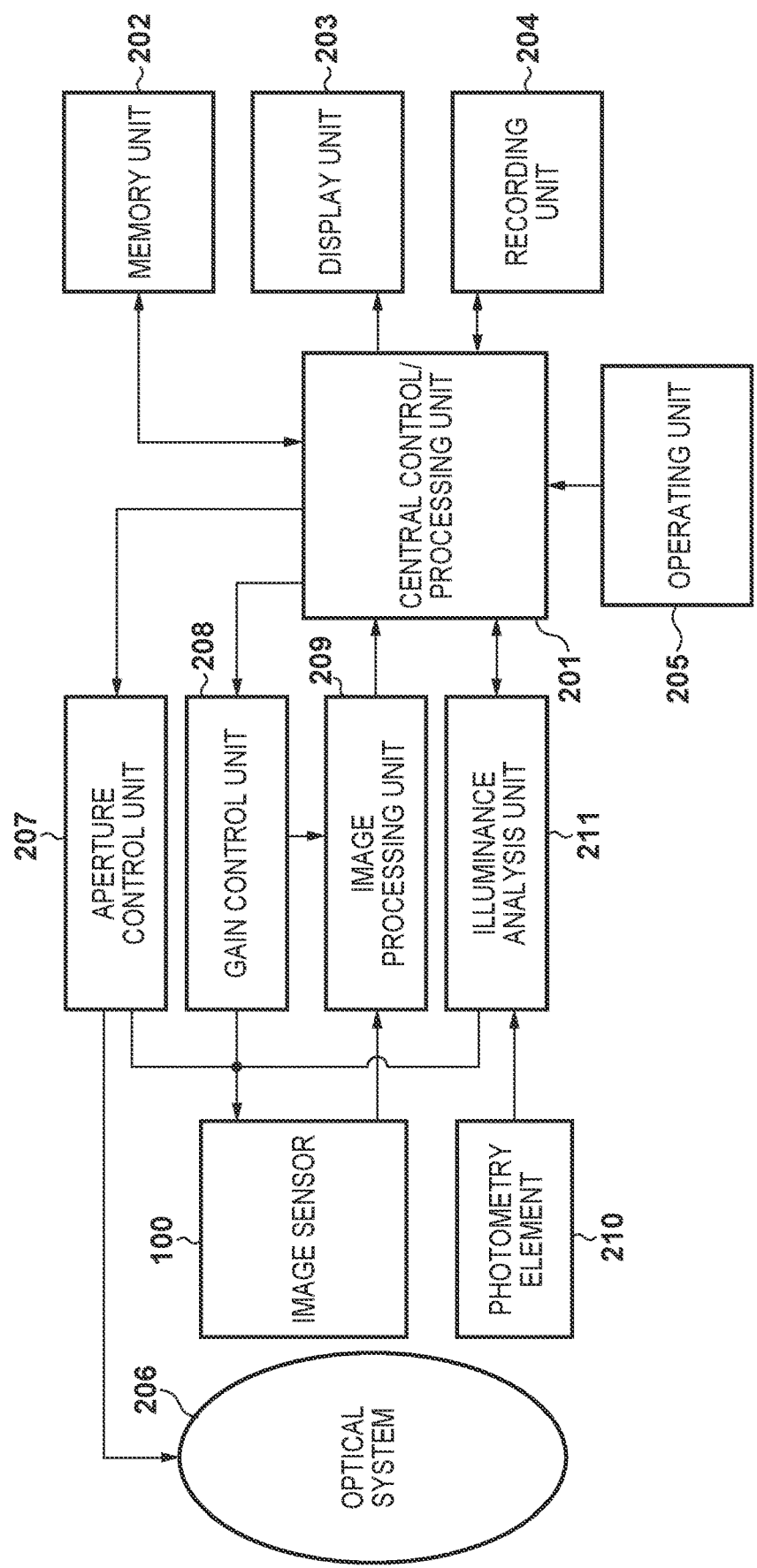
FIG. 2 is a block diagram illustrating the configuration of an image capturing apparatus according to a first embodiment of the present invention.

FIG. 2 is a block diagram illustrating the overall configuration of the image capturing apparatus 200 including the image sensor 100. As illustrated in FIG. 2, the image capturing apparatus 200 according to the first embodiment includes the image sensor 100, a central control/processing unit 201, a memory unit 202, a display unit 203, a recording unit 204, an operating unit 205, an optical system 206, an aperture control unit 207, a gain control unit 208, an image processing unit 209, a photometry element 210, and an illuminance analysis unit 211.

The image processing unit 209 generates one frame's worth of still image or moving image data, using the count values of the pixels 120 output from the DFE 160 in the image sensor 100 as brightness values of the corresponding pixel addresses. Processing such as gain processing, signal rearrangement, defective pixel correction, noise reduction, color conversion, white balance correction, gamma correction, resolution conversion, and data compression can also be carried out during the process of generating the images.

The central control/processing unit 201 includes a known CPU and the like, and controls the image capturing apparatus 200 as a whole. The central control/processing unit 201 also outputs the image data processed by the image processing unit 209 to the recording unit 204, the display unit 203, and the like. The memory unit 202 is a memory for computational processes carried out by the central control/processing unit 201, and is also used as a buffer memory during continuous shooting and the like.

The display unit 203 displays image signals received from the central control/processing unit 201. The recording unit 204 is a recording medium such as a memory card or a hard disk. The operating unit 205 electrically receives inputs from operating members such as a release button, switches, electronic dials, and the like.

The optical system 206 is constituted by a focus lens, a zoom lens, a stop, and the like. The image sensor 100 receives light through the optical system 206 and outputs the count values from the pixels 120 to the image processing unit 209 as described earlier. The aperture control unit 207 controls the size of an aperture diameter in the optical system 206 on the basis of an F-stop value set as desired by a user of the image capturing apparatus 200 or illuminance information obtained from the illuminance analysis unit 211.

The gain control unit 208 controls the value of gain applied in the gain processing by the image processing unit 209 on the basis of an ISO sensitivity set as desired by the user or the illuminance information obtained from the illuminance analysis unit 211. The photometry element 210 is a photometry sensor for measuring an illuminance in the image sensor 100 for the purpose of determining shooting conditions of the image capturing apparatus 200. The illuminance analysis unit 211 calculates the illuminance of the image sensor 100 by analyzing an output signal from the photometry element 210, and outputs the resulting illuminance information to the central control/processing unit 201.

Note that the configuration is such that the aperture control unit 207, the gain control unit 208, and the illuminance analysis unit 211 can output an aperture control value, a gain control value, and the illuminance information, respectively, to the voltage control unit 130 in the image sensor 100. The voltage control unit 130 can change Vqnc on the basis of this information. In particular, the present embodiment will describe a control method in which the voltage control unit 130 changes Vqnc according to the gain control value of the gain control unit 208.

Figure 3:
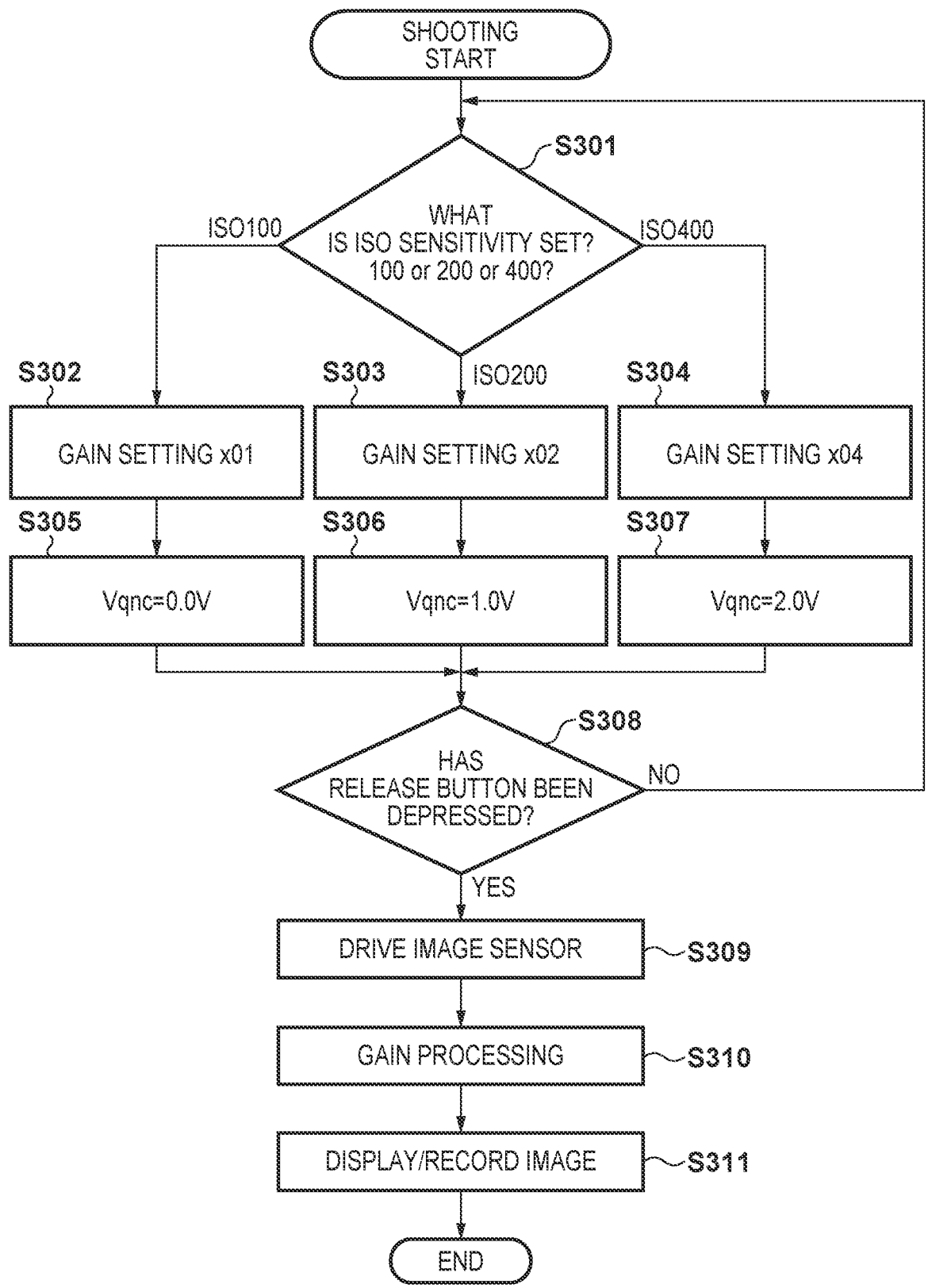
FIG. 3 is a flowchart illustrating a control method for an image sensor according to the first embodiment.

FIG. 3 is a flowchart illustrating a control method carried out during shooting, according to the first embodiment. In the image sensor 100 according to the first embodiment, the voltage control unit 130 controls the value of the voltage Vqnc in accordance with an ISO sensitivity setting (gain setting) in the image capturing apparatus 200.

In step S301, the ISO sensitivity set by the user is determined. The process moves to step S302 if the ISO is 100, to step S303 if the ISO is 200, and to step S304 if the ISO is 400.

In steps S302 to S304, the gain control unit 208 controls value of the gain used in the gain processing by the image processing unit 209. Although the gain processing can also be carried out by the DFE 160, the following will describe an example in which the image processing unit 209 carries out the gain processing. From the perspective of the image capturing apparatus 200, the ISO sensitivity is equivalent to the value of the gain in the gain processing on the count values from the pixels when generating the image data. In other words, assuming ISO 100 is a benchmark equivalent to 1× gain, the image processing unit 209 carries out the gain processing on the count values with 2× gain at ISO 200 and 4× gain at ISO 400. As such, in step S302, the gain is controlled to 1×; in step S303, to 2×; and in step S304, to 4×. The gain control value set here is also sent to the voltage control unit 130 within the image sensor 100.

In steps S305 to S307, the voltage control unit 130 controls the value of the voltage Vqnc in accordance with the gain control value. Here, by setting the voltage Vqnc to 0.0 V when the gain is 1×, to 1.0 V when the gain is 2×, and to 2.0 V when the gain is 4×, the signal pulse width is controlled to be relatively short at times of low ISO sensitivity and relatively long at times of high ISO sensitivity. Although FIG. 3 illustrates an example where there are three ISO sensitivities, namely 100, 200, and 400, similar control may be carried out for higher ISO sensitivities as well. According to this driving control method, the signal pulse width is controlled to be longer at times of high ISO sensitivity, which makes it possible to reduce the mistaken counting of afterpulses (described later) and improve the linearity. Details will be given later with reference to FIGS. 4 and 5.

In step S308, it is determined whether or not the user has depressed the release button. As long as the release button has not been depressed, the process returns to step S301, and the processes of steps S301 to S307 are repeated every predetermined period of time. The process moves to step S309 if the user has depressed the release button.

In step S309, the image sensor 100 is driven as described with reference to FIG. 1 in order to obtain the count values of the pixels 120. At this time, the voltage control unit 130 controls Vqnc to the voltage determined in steps S305 to S307, and the image sensor 100 is driven.

In step S310, the image data is generated by inputting the count values of the pixels 120, which have been output from the DFE 160 in the image sensor 100, to the image processing unit 209, and furthermore carrying out gain processing, according to the gain determined in step S302 to S304, in the image processing unit 209.

In step S311, the central control/processing unit 201 outputs the generated image data to the display unit 203 and displays the image that has been shot. The image data is also recorded in the recording unit 204.

As described above, with the image sensor 100 according to the first embodiment, the voltage control unit 130 controls the value of the voltage Vqnc so that the width of the signal pulse is relatively long at times of high ISO sensitivity. According to this driving control method, the mistaken counting of afterpulses is reduced and the linearity is improved. The reason why this improvement is possible will be described hereinafter with reference to FIGS. 4 and 5.

Figure 4:
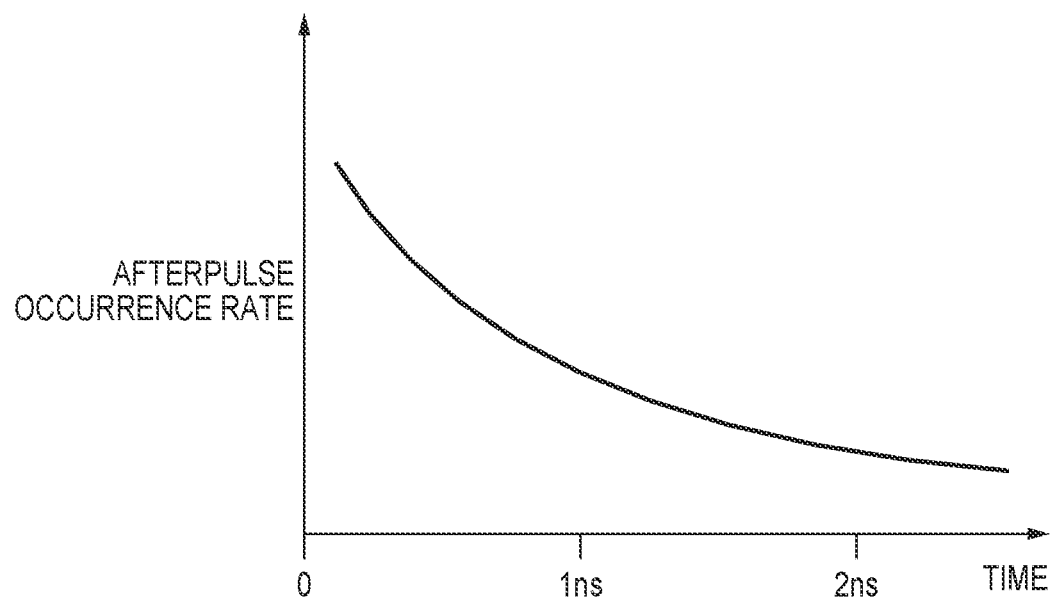
FIG. 4 is a diagram illustrating the relationship between elapsed time and an afterpulse occurrence rate in a pixel.

FIG. 4 is a graph illustrating the relationship between elapsed time and an afterpulse occurrence rate in the pixel 120. An "afterpulse" is a "false" signal pulse produced when a carrier captured in a crystal defect at the time of avalanche multiplication is released after time has passed and the next avalanche multiplication occurs. The horizontal axis represents the elapsed time after a photon is incident on the SPAD 121 and a signal pulse is produced. As indicated in FIG. 4, the afterpulse occurrence rate decreases exponentially as time passes following the occurrence of a signal pulse. If the afterpulse is mistakenly counted, the count value will be higher than the actual number of incident photons, which leads to a worsening in the linearity. However, a mistaken count will not occur even if avalanche multiplication arises within the SPAD 121 before the signal pulse produced at the node PLSd returns from high to low. As such, the rate at which afterpulses are mistakenly counted can be reduced by controlling the signal pulse width to be longer.

Figure 5:
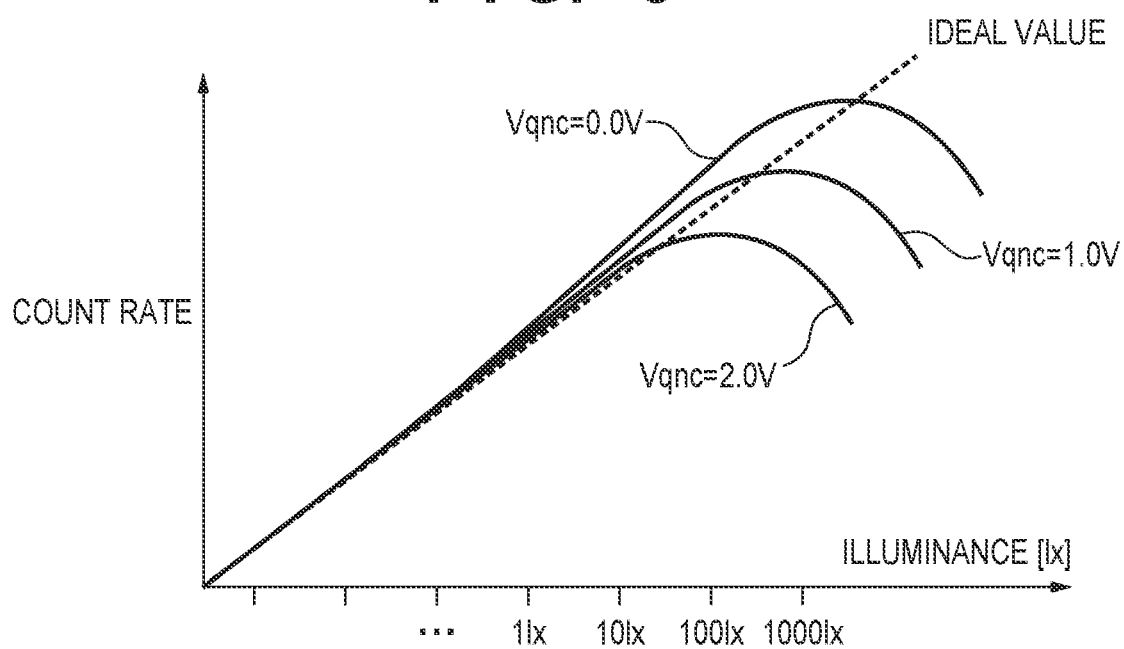
FIG. 5 is a diagram illustrating the relationship between a given illuminance and a photon count rate in a pixel.

FIG. 5 is a logarithmic graph illustrating the relationship between a given illuminance and a count rate in the image sensor 100. The illuminance on the horizontal axis is a value proportional to the actual number of photons incident on the SPAD 121 per unit of time. The count rate represented by the vertical axis is a count increase amount the counter 124 per unit of time. Ideally, the count rate is proportional to the illuminance, as indicated by the broken line in FIG. 5. However, if an afterpulse is mistakenly counted, the count value will be higher than the actual number of incident photons, as described with reference to FIG. 4. Accordingly, in the low- to mid-illuminance regions, the count rate is slightly higher than the ideal value, as indicated by the solid lines in FIG. 5. However, mistaken counts of afterpulses can be reduced by controlling the width of the signal pulse to be longer (i.e., to increase the value of the voltage Vqnc), which makes it possible to operate at a count rate closer to the ideal value. Accordingly, the linearity can be improved in low- to mid-illuminance regions by controlling the signal pulse width to be longer.

However, as described in the "background" section, if a new photon is incident before the signal pulse produced at the node PLSd returns from high to low, the count value will be lower than the actual number of incident photons. Thus as indicated in FIG. 5, on the high-illuminance side, where photons are frequently incident, the range where the count rate increases monotonically changes in accordance with the width of the signal pulse, and the count value drops with ease particularly when the width of the signal pulse is long (i.e., when the voltage Vqnc has a high value). However, when the shooting conditions include a high ISO sensitivity, the subject typically has a low brightness, and the illuminance on the image sensor is low. Accordingly, as illustrated in FIG. 3, controlling the width of the signal pulse to be longer at times of high ISO sensitivity will have little influence.

As described thus far with reference to FIGS. 1 to 5, in the image sensor 100 according to the present embodiment, the width of signal pulses produced when photons are incident is controlled by the voltage control unit 130 controlling the value of the voltage Vqnc in accordance with the shooting conditions of the image capturing apparatus 200. Good image quality with improved linearity can be obtained as a result.

Although the foregoing describes a driving method in which the voltage control unit 130 controls the width of the signal pulses, using the ISO sensitivity is an example of the shooting conditions, the present invention is not limited thereto. For example, the voltage control unit 130 may control the width of the signal pulses in accordance with the aperture control value in the aperture control unit 207. Alternatively, the voltage control unit 130 may control the width of the signal pulses in accordance with a value set for an exposure time when driving the image sensor 100.

Furthermore, the configuration of the pixels 120 is not limited to the configuration of the pixels 120 illustrated in FIG. 1. Other pixel configuration examples that can be applied in the image sensor 100 will be described next with reference to FIGS. 6 to 8.

Figure 6:
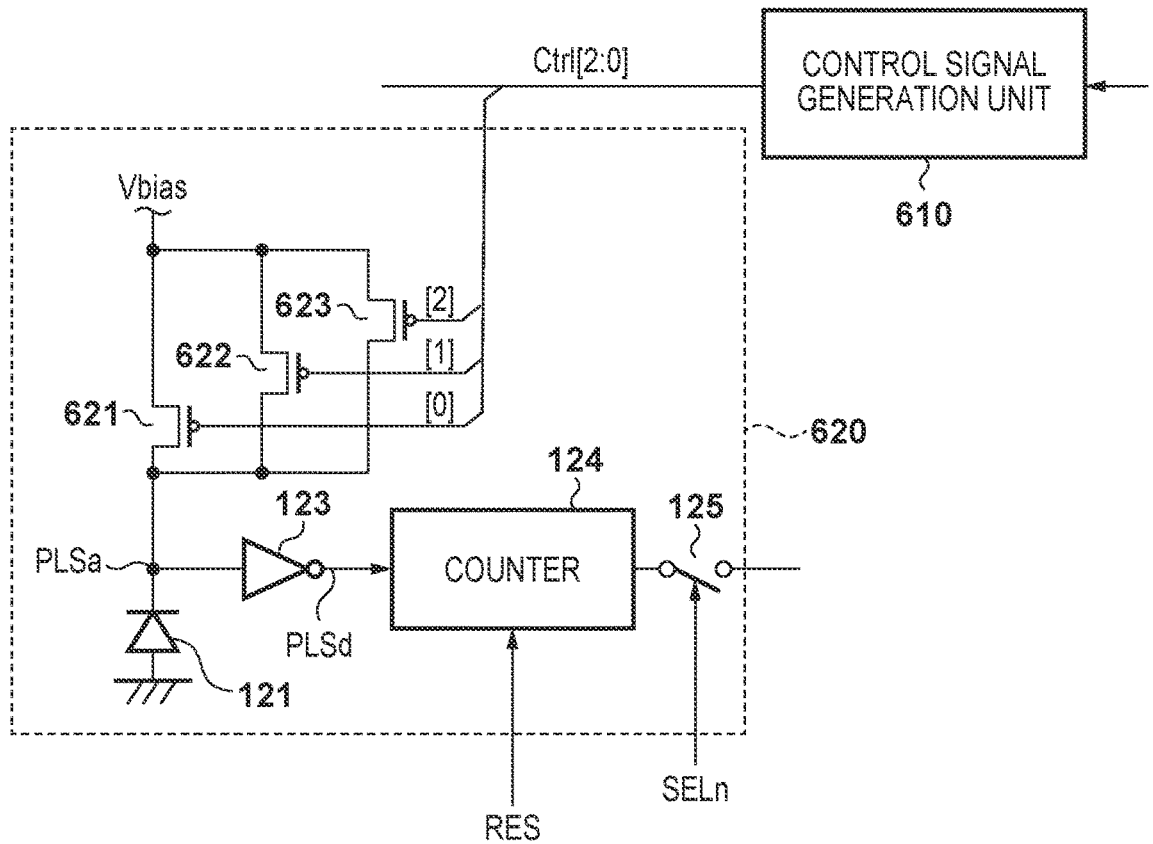
FIG. 6 is a diagram illustrating a second pixel configuration example in an image sensor.

First, FIG. 6 illustrates a second pixel configuration example in the image sensor 100. Constituent elements that are the same as those in FIG. 1 are given the same reference signs, and descriptions thereof will be omitted.

A pixel 620 illustrated in FIG. 6 includes quenching elements 621 to 623, the SPAD 121, the inverter 123, the counter 124, and the readout switch 125. The following descriptions assume that the quenching elements 621 to 623 are PMOSs. The configuration of the pixel 620 is a characteristic in that the three quenching elements 621 to 623 are connected in parallel between the voltage Vbias and the SPAD 121. A combined resistance value of the quenching elements 621 to 623 can be changed by controlling a voltage applied to the gates of the quenching elements 621 to 623 (gate voltages) to high or low. As with the pixel 120 illustrated in FIG. 1, changing the combined resistance value makes it possible to change the width of the signal pulse.

In the second pixel configuration example, the image sensor 100 includes a control signal generation unit 610 instead of the voltage control unit 130 illustrated in FIG. 1. The control signal generation unit 610 outputs a three-bit digital signal pulse Ctrl [2:0] to the gates of the quenching elements 621 to 623 in accordance with the shooting conditions of the image capturing apparatus 200. Signals corresponding to the bits of the signal pulse Ctrl are input to the gate terminals of the quenching elements, so that Ctrl[0] is input to the quenching element 621, Ctrl[1] is input to the quenching element 622, and Ctrl[2] is input to the quenching element 623.

Here, if the shooting conditions indicate ISO 100, for example, the control signal generation unit 610 sets all of the three bits of Ctrl[2:0] to low. If the shooting conditions indicate ISO 200, for example, the control signal generation unit 610 sets one of the three bits of Ctrl[2:0] to high and the other two bits to low. If the shooting conditions indicate ISO 400, for example, the control signal generation unit 610 sets two of the three bits of Ctrl[2:0] to high and one bit to low. In this manner, a similar effect to that of the pixel configuration illustrated in FIG. 1 is achieved by the control signal generation unit 610 driving the quenching elements 621 to 623 of the pixel 620 in accordance with the shooting conditions.

Figure 7:
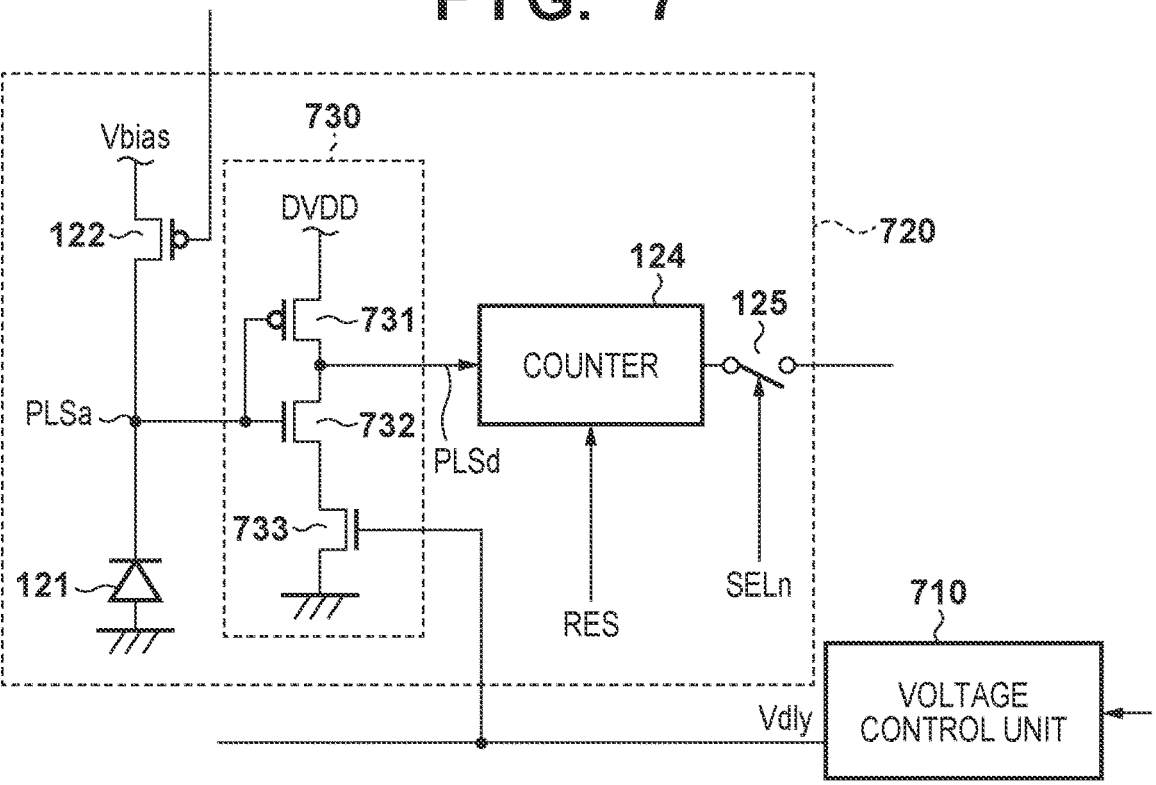
FIG. 7 is a diagram illustrating a third pixel configuration example in an image sensor.

Next, FIG. 7 illustrates a third pixel configuration example in the image sensor 100. Constituent elements that are the same as those in FIG. 1 are given the same reference signs, and descriptions thereof will be omitted.

A pixel 720 illustrated in FIG. 7 includes the SPAD 121, the quenching element 122, the counter 124, the readout switch 125, and an inverter 730. Note that the quenching element 122 is driven by having a constant voltage (e.g., 0.0 V) applied to the gate terminal thereof. The inverter 730 includes a PMOS 731, an NMOS 732, and an NMOS 733. The gates of the PMOS 731 and the NMOS 732 are connected to the node PLSa, and constitute an input terminal of the inverter 730. The drain of the PMOS 731 and the drain of the NMOS 732 are connected to the node PLSd, and constitute an output terminal of the inverter 730.

In the third pixel configuration example, the image sensor 100 includes a voltage control unit 710 instead of the voltage control unit 130 illustrated in FIG. 1. The voltage control unit 710 outputs a voltage Vdly to the gate of the NMOS 733 in accordance with the shooting conditions of the image capturing apparatus 200.

A known inverter circuit configuration can be driven logically as long as the PMOS 731 and the NMOS 732 are present. However, the inverter 730 further includes the NMOS 733, which provides a configuration that can delay a response to the fall of the output signal pulse thereof (PLSd). In other words, when a charge that had been stored at the node PLSd is discharged to GND when the node PLSd changes from high to low, the presence of the NMOS 733 as a resistance component delays the response (response characteristics) to the fall. The drain-source resistance of the NMOS 733 differs depending on the voltage Vdly applied to the gate, with the resistance component decreasing as the value of the voltage Vdly increases and the resistance component increasing as the value of the voltage Vdly decreases. Accordingly, the width of the signal pulse produced at the node PLSd in response to the incidence of a photon can be changed by the voltage control unit 710 changing the voltage Vdly in accordance with the shooting conditions of the image capturing apparatus 200.

Here, if the shooting conditions have ISO 100, for example, the voltage control unit 710 sets the voltage Vdly to a relatively high voltage (e.g., 2.0 V). If the shooting conditions have ISO 400, for example, the voltage control unit 710 sets the voltage Vdly to a relatively low voltage (e.g., 0.0 V). In this manner, a similar effect to that of the pixel configuration illustrated in FIG. 1 is achieved by the voltage control unit 710 setting the voltage Vdly in accordance with the shooting conditions and carrying out the driving. Note that the current may be adjusted in a similar manner even when a buffer that does not invert the polarity is used in the pixel 720 instead of the inverter 730. Furthermore, the configuration the inverter 730 illustrated in FIG. 7 is merely an example, and various other configurations can be applied as well.

Figure 8:
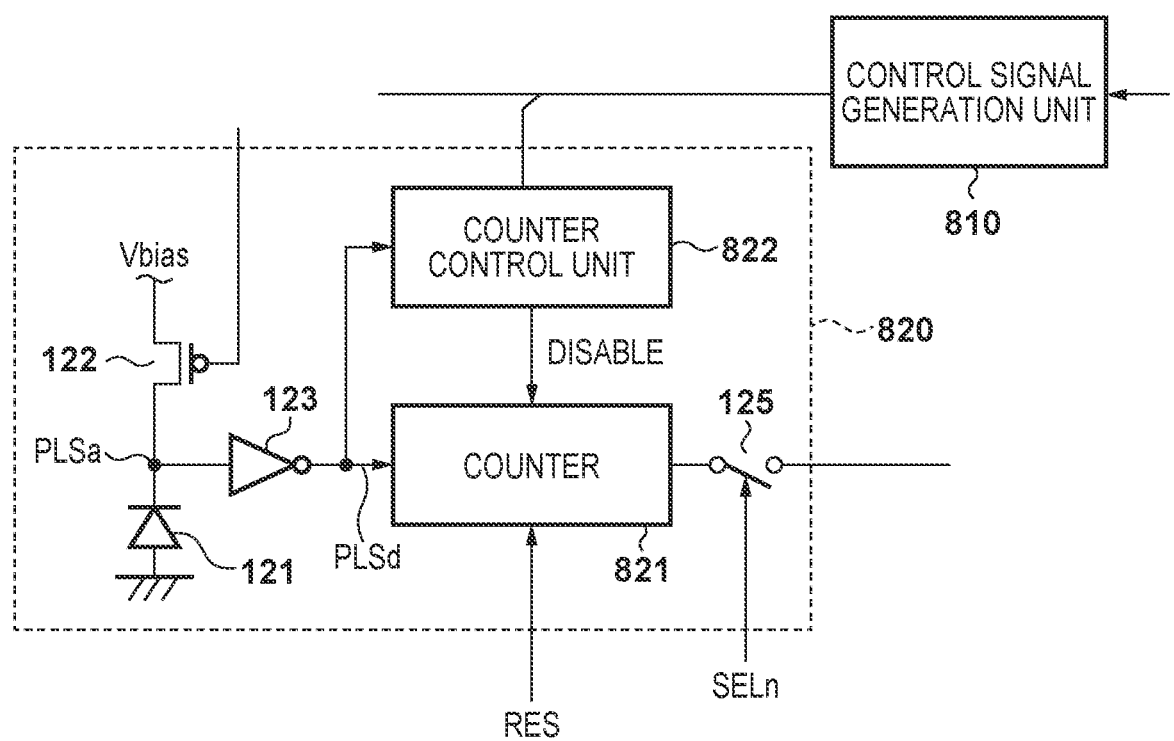
FIG. 8 is a diagram illustrating a fourth pixel configuration example in an image sensor.

Next, FIG. 8 illustrates a fourth pixel configuration example in the image sensor 100. Constituent elements that are the same as those in FIG. 1 are given the same reference signs, and descriptions thereof will be omitted.

A pixel 820 illustrated in FIG. 8 includes the SPAD 121, the quenching element 122, the inverter 123, the readout switch 125, a counter 821, and a counter control unit 822. Note that the quenching element 122 is driven by having a constant voltage (e.g., 0.0 V) applied to the gate terminal thereof.

In the fourth pixel configuration example, the image sensor 100 includes a control signal generation unit 810 instead of the voltage control unit 130 illustrated in FIG. 1. The control signal generation unit 810 sets a time Td for the counter control unit 822 in accordance with the shooting conditions of the image capturing apparatus 200.

The configuration of the pixel 820 has a characteristic in that the counter 821 includes an ENABLE terminal, and the pixel further includes the counter control unit 822. The counter control unit 822 outputs a DISABLE signal for temporarily stopping the counting operations of the counter 821, during the time Td following the timing at which the signal pulse of the node PLSd has changed from low to high. In other words, the configuration is such that after the counter 821 has counted a signal pulse, the counter 821 cannot count the next signal pulse for the set time Td. As such, until the time Td has elapsed following the counting of a single pulse, the next signal pulse produced by a photon being incident, the occurrence of an afterpulse, or the like will be ignored.

Here, if the shooting conditions have ISO 100, for example, the control signal generation unit 810 sets a short time for the time Td in the counter control unit 822. Alternatively, if the shooting conditions have ISO 400, for example, the control signal generation unit 810 sets a long time for the time Td in the counter control unit 822. In this manner, a similar effect to that of the pixel configuration illustrated in FIG. 1 is achieved by the control signal generation unit 810 setting the time Td in the counter control unit 822 in accordance with the shooting conditions and carrying out the driving.

Second Embodiment

A control method for the image sensor 100 according to a second embodiment of the present invention will be described next with reference to FIGS. 9 to 13B. The configuration of the image sensor 100 according to the second embodiment is the same as in the first embodiment, and will therefore not be described. The present embodiment will primarily describe ways in which the control differs from that in the first embodiment.

Figure 9:
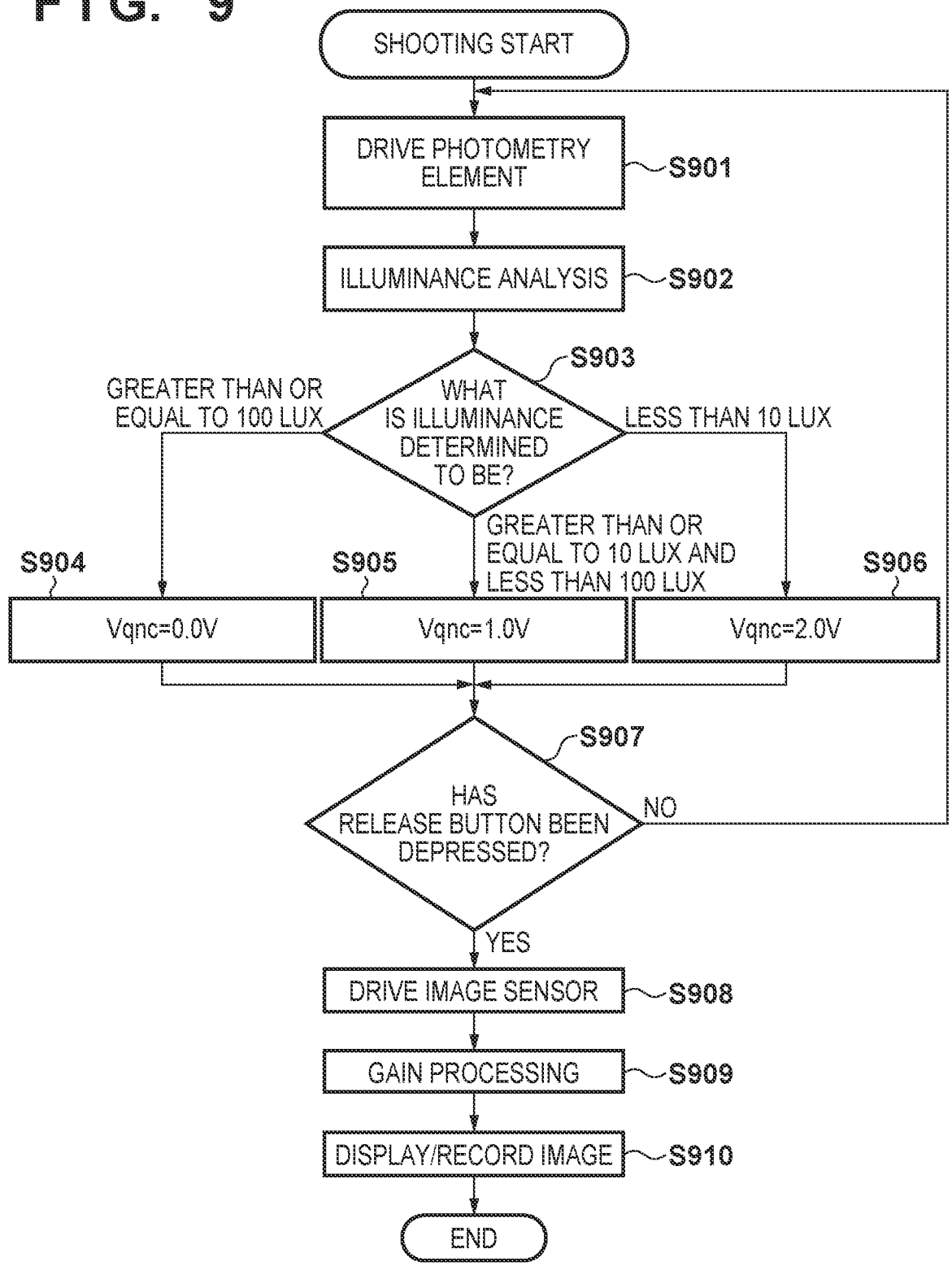
FIG. 9 is a flowchart illustrating a control method for an image sensor according to a second embodiment.

FIG. 9 is a flowchart illustrating a control method carried out during shooting, according to the second embodiment. In the image sensor 100 according to the second embodiment, the voltage control unit 130 controls the value of the voltage Vqnc in accordance with an illuminance in the pixel unit 110. In other words, while the value of the voltage Vqnc is changed in accordance with the shooting conditions of the image capturing apparatus 200 and the first embodiment, and the second embodiment, the value of the voltage Vqnc is changed by referring to the illuminance itself, which corresponds to the state of the image sensor 100.

In step S901, the photometry element 210 is driven in order to measure the illuminance in the image sensor 100. In step S902, the illuminance in the image sensor 100 is calculated by the illuminance analysis unit 211 analyzing an output signal from the photometry element 210. In step S903, illuminance information obtained from the illuminance analysis unit 211 is judged. If the illuminance is greater than or equal to 100 lux, the process moves to step S904; if the illuminance is greater than or equal to 10 lux but less than 100 lux, the process moves to step S905; and if the illuminance is less than 10 lux, the process moves to step S906.

In steps S904 to S906, the voltage control unit 130 controls the value of the voltage Vqnc in accordance with the illuminance information. Here, the voltage Vqnc is 0.0 V when the illuminance is greater than or equal to 100 lux; 1.0 V, when the illuminance is greater than or equal to 10 lux but less than 100 lux; and 2.0 V, when the illuminance is less than 10 lux. Accordingly, the width of the signal pulse is controlled to be relatively short at times of high illuminance and relatively long at times of low illuminance. Although FIG. 9 illustrates an example in which the illuminance is divided into a table of three sections, the same control may be carried out in a situation where the table is divided into finer sections, as well as for higher- or lower-illuminance regions.

In step S907, it is determined whether or not the user has depressed the release button. As long as the release button has not been depressed, the process returns to step S901, and the processes of steps S901 to S906 are repeated every predetermined period of time. The process moves to step S908 if the user has depressed the release button.

In step S908, the image sensor 100 is driven as described with reference to FIG. 1 in order to obtain the count values of the pixels 120. At this time, the voltage control unit 130 controls Vqnc to the voltage determined in steps S904 to S906, and the image sensor 100 is driven. In step S909, the image data is generated by inputting the count values of the pixels 120, which have been output from the DFE 160 in the image sensor 100, to the image processing unit 209, and furthermore carrying out gain processing, based on the ISO sensitivity setting, in the image processing unit 209.

In step S910, the central control/processing unit 201 outputs the generated image data to the display unit 203 and displays the image that has been shot. The image data is also recorded in the recording unit 204.

Thus as described above, with the image sensor 100 according to the second embodiment, controlling the width of the signal pulse to be longer (i.e., controlling the value of the voltage Vqnc to be higher) when the image sensor 100 is in a low-illuminance state reduces mistaken counts of afterpulses and improves the linearity. When the image sensor 100 is in a low-illuminance state, there will be little effect even if the illuminance range in which the count rate increases monotonically is narrow. On the other hand, if the image sensor 100 is in a high-illuminance state, the width of the signal pulse is controlled to be shorter (i.e., the value of the voltage Vqnc is controlled to be lower) so that the count rate increases monotonically up to the high-illuminance side. By using this control method, the image sensor 100 according to the second embodiment can improve the linearity.

Although the second embodiment describes a driving method in which the width of the signal pulse is controlled using the illuminance as an example of the state of the image sensor, the present invention is not limited thereto. For example, the illuminance may be estimated on the basis of the count value of the pixel 120, and the value of the voltage Vqnc may be changed on the basis of the estimated illuminance. For example, the illuminance analysis unit 211 can estimate the illuminance in the image sensor 100 by reading out a count value obtained by counting the photons in a predetermined exposure time as pre-shooting carried out prior to the driving for the actual shooting.

The illuminance analysis unit 211 can also estimate the illuminance without carrying out pre-shooting, by using the count value in a frame before the continuous shooting of still images or shooting a moving image. As such, the photometry element 210 is not absolutely necessary in the second embodiment. Using such driving control also makes it possible to change the value of the voltage Vqnc partway through a predetermined accumulation time in a single frame period. An example of this will be described using FIG. 10.

Figure 10:
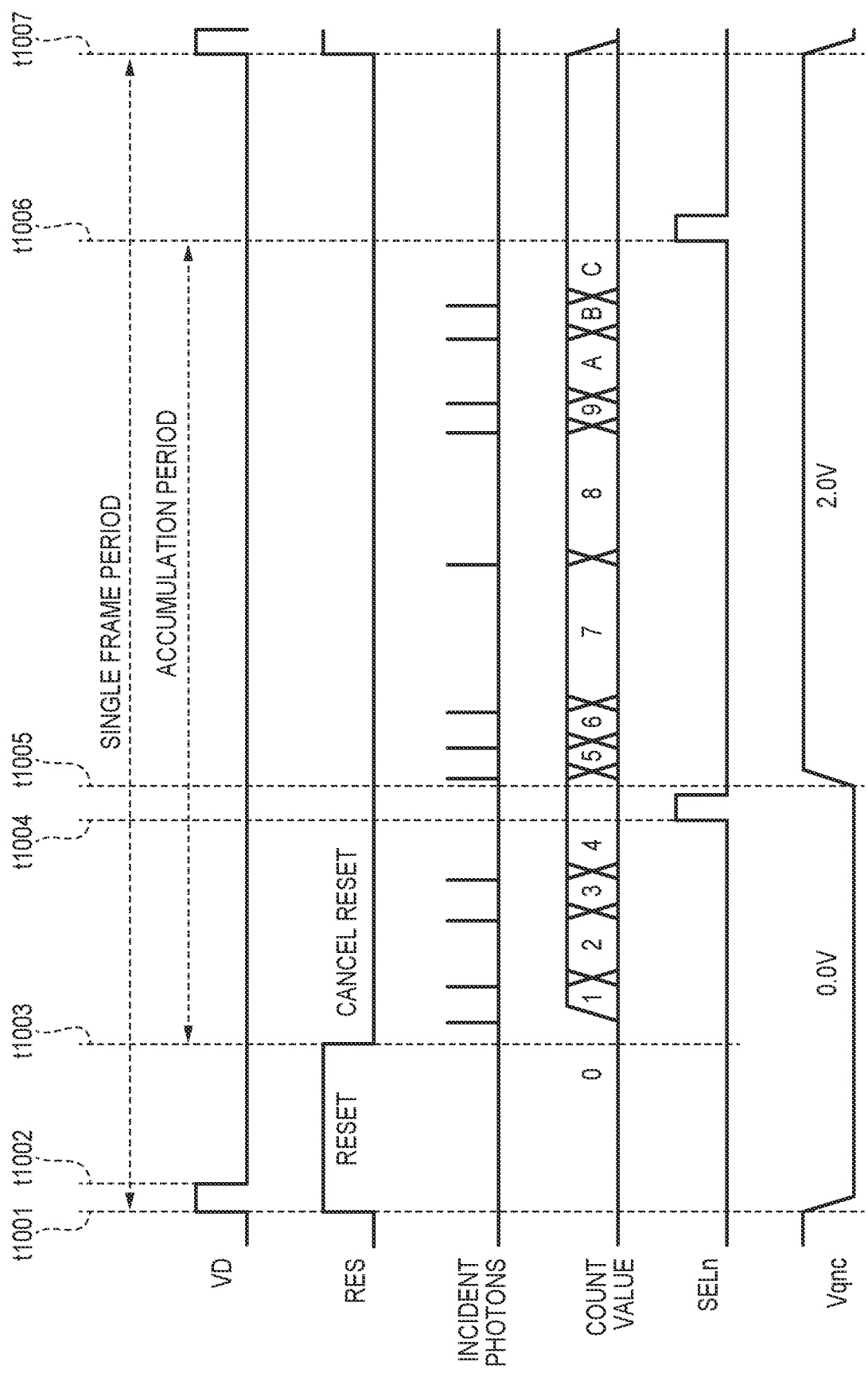
FIG. 10 is a timing chart illustrating a driving method for the image sensor according to the second embodiment.

FIG. 10 is a timing chart for a single frame period of the image sensor 100 according to the present embodiment.

In a period from time t1001 to time t1002, the TG 140 sets the signal pulse RES to high in response to the central control/processing unit 201 setting a synchronization pulse VD to high. At this time, the counter 124 is reset. At time t1001, the voltage control unit 130 controls the voltage Vqnc to 0.0 V.

Time t1003 to time t1006 corresponds to an accumulation period. In the accumulation period, the photon counter 124 detects and counts the number of rises and the signal pulse at the node PLSd. Specifically, at time t1003, the TG 140 sets the signal pulse RES to low. At this time, the counter 124 cancels the reset, and starts counting the signal pulses output in response to photons being incident on the SPAD 121. The numbers 0 to 9 and the letters in the signal pulses indicated by the count value in FIG. 10 indicate an example in which the photon count value of the pixel 120 is a hexadecimal.

Partway through the accumulation period, in a predetermined period from time t1004 to time t1005, the TG 140 sets the signal pulse SELn to high. At this time, the count value, which corresponds to the number of photons incident in the period from time t1003 to time t1004, is read out from the pixel 120 and output to the central control/processing unit 201. In the central control/processing unit 201, the illuminance analysis unit 211 estimates the illuminance in the image sensor on the basis of the count value, which corresponds to the number of photons incident in the period from time t1003 to time t1004, and outputs that illuminance to the voltage control unit 130. Note, however, that the counter 124 does not reset the count value obtained up to time t1004, and instead continues the count up to time t1006.

At time t1005, the voltage control unit 130 changes the value of the voltage Vqnc as described with reference to FIG. 9, in accordance with the estimated illuminance. FIG. 10 illustrates an example in which the voltage Vqnc is controlled to 2.0 V in response to an illuminance of less than 10 lux having been estimated at time t1005. Accordingly, the accumulation period from time t1005 to time t1006 can employ driving having improved linearity.

When, at time t1006, the TG 140 sets the signal pulse SELn to high, the count value counted by the counter 124 during the accumulation period is read out to the column memory 150, and is further output to the DFE 160 in a later stage. When all of the rows are scanned and the count values of the pixels 120 are read out by time t1007, the single frame period ends.

By estimating the illuminance on the basis of the count value partway through a predetermined accumulation time in a single frame period in this manner, the value of the voltage Vqnc can be changed, and the width of the signal pulse can be controlled, even without carrying out pre-shooting or referring to the count value from the previous frame.

Additionally, the width of the signal pulse may be controlled in accordance with the temperature of the image sensor 100, for example. In other words, the configuration may be such that the voltage control unit 130 controls the value of the voltage Vqnc on the basis of temperature information of the image sensor 100, output by the temperature measurement unit 170. The phenomenon of carriers being trapped by crystal defects and then released, which is a cause of afterpulsing, occurs with more frequency when the image sensor is at a higher temperature. Accordingly, it is more likely for a worsening in linearity, random noise, and so on caused by afterpulsing to arise when the image sensor 100 is at a high temperature. Accordingly, an even better image quality with improved linearity from temperature to temperature can be obtained by the voltage control unit 130 further considering the temperature state of the image sensor 100 in the control of the voltage Vqnc.

FIG. 9 illustrates an example in which the value of the voltage Vqnc is controlled by referring to a single value in the plane of the pixel unit 110 (e.g., an average illuminance of the overall pixel unit) as the illuminance of the image sensor 100. However, different signal pulse width control can be carried out for predetermined regions or on a pixel-by-pixel basis by providing a plurality of the voltage control units 130 illustrated in FIG. 1 for each of the predetermined regions or on a pixel-by-pixel basis in the pixel unit 110. First to third variations on the second embodiment, in which different signal pulse with control is carried out for predetermined regions or on a pixel-by-pixel basis, will be described next with reference to FIGS. 11 to 13.

FIG. 11 illustrates an example of a region division method according to the first variation on the second embodiment. An image capturing region 1101 in the outside frame in FIG. 11 corresponds to the region of the pixel unit 110, and is an example of a scene in which a background image has been shot. A divided region 1102 corresponds to a single region obtained by dividing the image capturing region 1101. In each divided region 1102, a plurality of the pixels 120 are arranged in a matrix. Although this example illustrates seven divided regions 1102 in the horizontal direction and five divided regions 1102 in the vertical direction, in reality, the divided regions may be provided at a finer level. In FIG. 11, the (0,0), (0,1), (0,2), and so on in the divided regions 1102 correspond to addresses within the image capturing region 1101.

The first variation on the second embodiment has a characteristic in that the photometry element 210 measures the illuminance for each divided region 1102, and the voltage control unit 130 then controls the value of the voltage Vqnc, in the same manner as in FIG. 9, in accordance with the illuminance of each divided region 1102. For example, if the illuminance in the divided region (0,0) is 500 lux, the voltage control unit 130 controls the voltage Vqnc to 0.0 V for the plurality of pixels 120 within the divided region (0,0), in accordance with FIG. 9. Likewise, if, for example, the illuminance in the divided region (1,1) is 50 lux, the voltage control unit 130 controls the voltage Vqnc to 1.0 V for the plurality of pixels 120 within the divided region (1,1).

In this manner, according to the first variation on the second embodiment, the photometry element 210 measures the illuminance for each divided region 1102, and the voltage control unit 130 controls the value of the voltage Vqnc in accordance with the illuminance of each divided region 1102. Through this driving control, good image quality with improved linearity can be achieved for each region, even if objects having different brightnesses are intermixed within a shot scene.

FIG. 12 is a diagram illustrating the arrangement of color filters in the pixel unit 110 of the image sensor 100, for describing the second variation on the second embodiment. An image capturing region 1201 in the outside frame in FIG. 12 corresponds to the region of the pixel unit 110. Color filters 1202a to 1202d are transmissive filters arranged for each of corresponding pixels 120, on the side on which light is incident. In FIG. 12, the color filters indicated by R, G, and B are formed using materials that transmit different wavelengths of light. Here, the configuration is such that R primarily transmits red light at a wavelength of 600 to 700 nm; G primarily transmits green light at a wavelength of 500 to 570 nm; and B primarily transmits blue light at a wavelength of 450 to 500 μm. FIG. 12 illustrates an arrangement pattern known as a Bayer array as an example of the color filter arrangement.

The second variation of the second embodiment has a characteristic in that the voltage control unit 130 controls the value of the voltage Vqnc in accordance with the wavelength transmitted by the color filter 1202 arranged for each pixel 120. The transmittance differs depending on the wavelength transmitted by the color filter. Accordingly, an even better image quality with improved linearity for each color of color filter can be obtained by the voltage control unit 130 further considering the transmittance of each color of color filter in the control of the value of the voltage Vqnc.

Figure 13A:
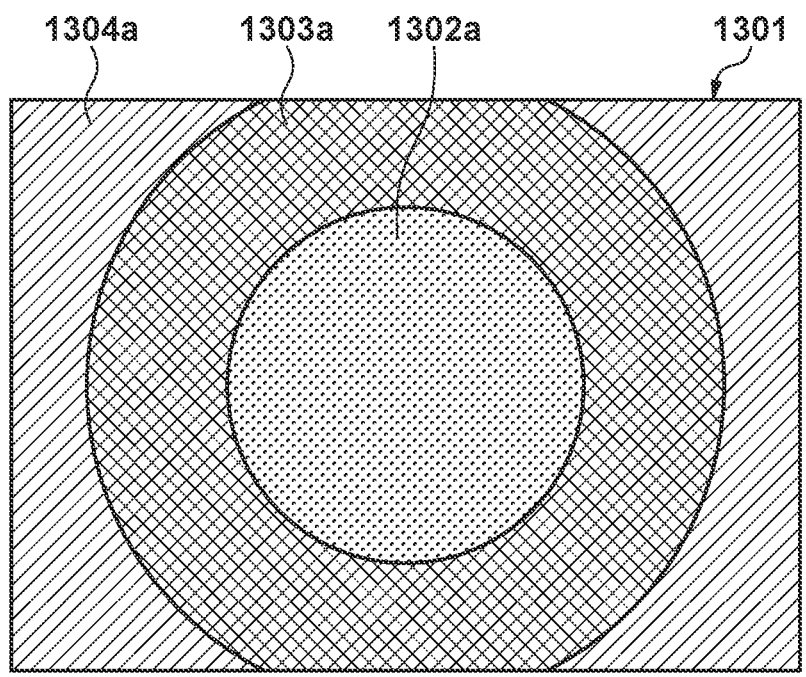
FIGS. 13A and 13B are diagrams illustrating a method for dividing an image capturing region according to a third variation on the second embodiment.
Figure 13B:
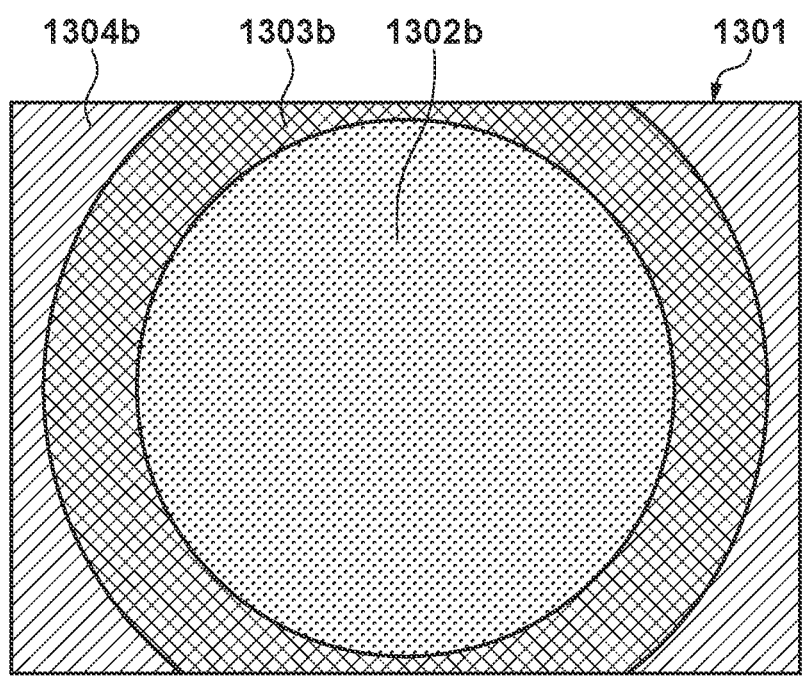

FIGS. 13A and 13B illustrate an example of a region division method according to the third variation on the second embodiment. An image capturing region 1301 in the outside frame in FIGS. 13A and 13B corresponds to the region of the pixel unit 110. In FIG. 13A, divided regions 1302a, 1303a, and 1304a are regions obtained by dividing the image capturing region 1301 into three concentric circular regions. Likewise, in FIG. 13B, divided regions 1302b, 1303b, and 1304b are regions obtained by dividing the image capturing region 1301 into larger-diameter concentric circles than in FIG. 13A. In each divided region 1302a to 1304a and 1302b to 1304b, a plurality of the pixels 120 are arranged in a matrix. Although FIGS. 13A and 13B illustrate examples of division into three concentric circular regions, in reality, the division may be carried out on a finer level.

The third variation on the second embodiment has a characteristic in that the voltage control unit 130 controls the value of the voltage Vqnc for each region separated by image height, in light of what is known as a drop in the peripheral light amount, in which the illuminance drops from the center of the optical axis in the image capturing region 1301 toward the periphery. For example, the voltage control unit 130 controls the voltage Vqnc to 0.0 V for the pixels 120 present in the divided region 1302a; to 1.0 V, for the pixels 120 present in the divided region 1303a; and to 2.0 V, for the pixels 120 present in the divided region 1304a. Through this driving control, good image quality with improved linearity can be achieved in each region, from the center to the peripheral parts, of the screen.

Furthermore, the region division method may be changed in accordance with the control value for the aperture in the optical system 206 (the F-stop value). In other words, under shooting conditions where the aperture is narrowed (where the F-stop value is high), the drop in the peripheral light amount is reduced, and thus the image quality can be further improved by applying a region division method based on the F-stop value as indicated in FIG. 13B. For example, the voltage control unit 130 controls the voltage Vqnc to 0.0 V for the pixels 120 present in the divided region 1302b; to 1.0 V, for the pixels 120 present in the divided region 1203b; and to 2.0 V, for the pixels 120 present in the divided region 1304b.

Although the first to third variations on the second embodiment describe controlling the value of the voltage Vqnc on a region-by-region basis, the pixels may be configured as illustrated in FIG. 8, and the counter control unit 822 may control the counter 821 on a region-by-region basis.

Figure 14A:
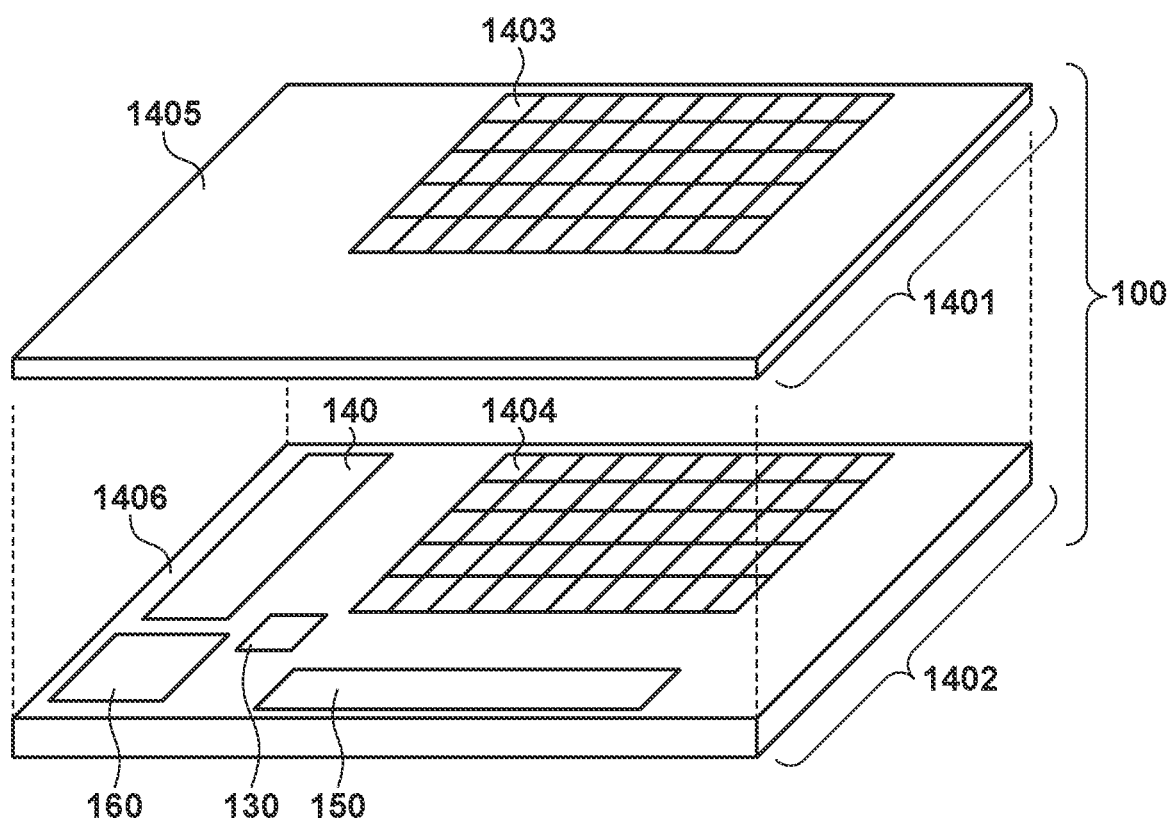
FIGS. 14A and 14B are schematic diagrams illustrating the semiconductor chip structure of an image sensor.
Figure 14B:
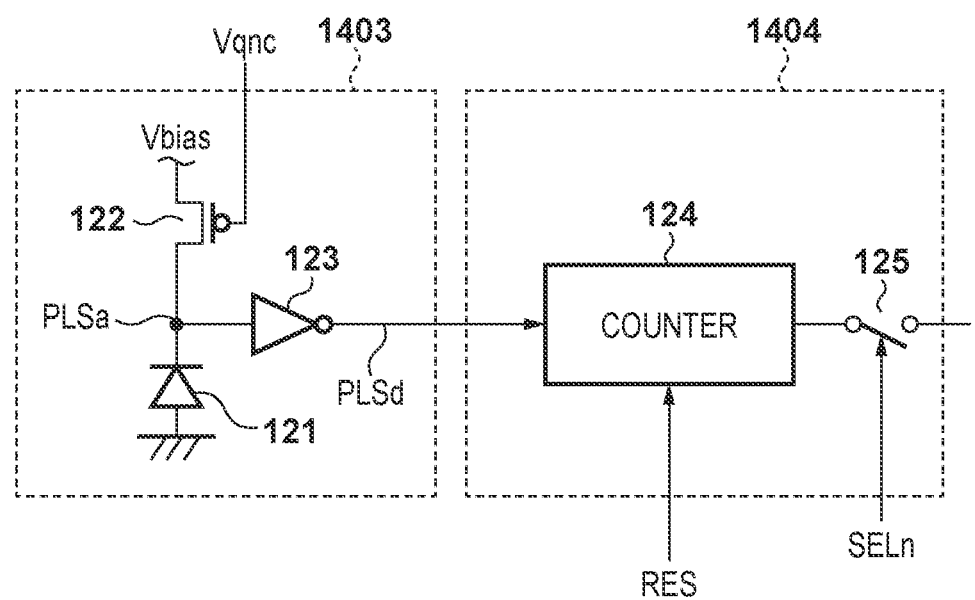

Finally, an example of the configuration of a semiconductor chip for the image sensor 100 according to the first and second embodiments will be described. FIGS. 14A and 14B are schematic diagram illustrating an example of the semiconductor chip structure of the image sensor 100.

FIG. 14A is a diagram illustrating a case where the image sensor 100 is configured by stacking two semiconductor chips. FIG. 14B, meanwhile, is a diagram illustrating on which of the two semiconductor chips the constituent elements of the pixels 120 are arranged.

In the image sensor 100, each pixel 120 includes many constituent elements. The counter 124 in particular is configured to hold multi-bit data, and thus the scale of the circuit is large. As such, the image sensor 100 is preferably implemented through a stacked structure, in which a plurality of semiconductor chips are connected in units of pixels.

As illustrated in FIG. 14A, the image sensor 100 is constituted by an upper substrate 1401, which receives light passing through an optical system (not shown), and a lower substrate 1402, which primarily includes digital circuitry. A pixel unit 1403 on the upper substrate 1401 side includes the SPAD 121, the quenching element 122, and the inverter 123 of each pixel 120, as illustrated in FIG. 14B. On the other hand, a pixel unit 1404 on the lower substrate 1402 side includes the counter 124, the readout switch 125, and the column output lines 126 of each pixel 120. The TG 140, the column memory 150, and the DFE 160 are included in either a peripheral circuit unit 1405 of the upper substrate 1401 or a peripheral circuit unit 1406 of the lower substrate 1402. FIGS. 14A and 14B illustrate an example in which these (the TG 140, the column memory 150, and the DFE 160) are arranged in the peripheral circuit unit 1406 of the lower substrate 1402.

By employing such a configuration, the image sensor 100 can ensure an opening area sufficient for photons to be incident on the SPADs 121 in the pixel unit 1403 on the upper substrate 1401 side, as well as a circuit area for holding multi-bit signal data in the counter 124 on the lower substrate 1402 side. Furthermore, by arranging the inverters 123 in the pixel unit 1403 on the upper substrate 1401 side, the transmission of signals from the upper substrate 1401 to the lower substrate 1402 can be carried out in a relatively robust manner with the waveform-shaped signal pulses (node PLSd).

Note, however, that the semiconductor chip structure of the image sensor 100 can be changed freely in accordance with the purpose and application. For example, a stacked structure having three or more semiconductor chips may be used, or only a single chip may be used. Each of the plurality of semiconductor chips may be manufactured according to different process rules.

Although preferred embodiments of the present invention have been described above, the present invention is not intended to be limited to these embodiments, and many variations and alterations are possible within the scope thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-082459, filed Apr. 23, 2018, which is hereby incorporated by reference herein in its entirety.

What is claimed is:

1. An image capturing apparatus comprising:
an image sensor including a plurality of pixels, each pixel being configured to include a sensor unit that outputs a signal pulse in response to a single photon being received, and a counter that counts the signal pulses and outputs a count value; and
at least one processor or circuit configured to function as a control unit configured to control a pulsewidth of the signal pulses in accordance with a magnitude of a gain with which the count value is multiplied,
wherein the control unit controls the pulsewidth of the signal pulses such that the pulsewidth in a case that the gain is relatively high is longer than the pulsewidth in a case that the gain is relatively low.

2. The image capturing apparatus according to claim 1, wherein the image capturing apparatus comprises a plurality of the control units; and
the plurality of the control units change the pulsewidths of the signal pulses in each of image capturing regions, in accordance with the magnitude of the gain.

3. The image capturing apparatus according to claim 2, wherein the plurality of the control units change the pulsewidths of the signal pulses on a pixel-by-pixel basis, in accordance with the magnitude of the gain.

4. The image capturing apparatus according to claim 1, wherein the sensor unit includes an avalanche photodiode and a quenching element; and
the control unit changes the pulsewidth of the signal pulses by changing a voltage applied to the quenching element.

5. The image capturing apparatus according to claim 1, wherein the sensor unit includes an avalanche photodiode and a quenching element; and
the control unit changes the pulsewidth of the signal pulses by changing a resistance value of the quenching element.

6. The image capturing apparatus according to claim 5, wherein the quenching element includes a plurality of MOS transistors; and the control unit changes the resistance value of the quenching element by changing gate voltages of the MOS transistors.

7. The image capturing apparatus according to claim 1,
wherein the sensor unit includes a buffer that outputs the signal pulses; and
the control unit changes the pulsewidth of the signal pulses by changing response characteristics of the buffer.

8. An image capturing apparatus comprising:
an image sensor including a plurality of pixels, each pixel being configured to include a sensor unit that outputs a signal pulse in response to a single photon being received, a counter that counts the signal pulses and outputs a count value, and a counter controller that controls the counter to not count signal pulses in a predetermined period after the occurrence of the signal pulse; and
at least one processor or circuit configured to function as a control unit configured to control the predetermined period in accordance with a magnitude of a gain with which the count value is multiplied,
wherein the control unit controls the predetermined period such that the predetermined period in a case that the gain is relatively high is longer than the predetermined period in a case that the gain is relatively low.

9. The image capturing apparatus according to claim 8,
wherein the image capturing apparatus comprises a plurality of the control units; and
the plurality of the control units change the predetermined period in each of image capturing regions, in accordance with the magnitude of the gain.

10. The image capturing apparatus according to claim 9,
wherein the plurality of the control units change the predetermined period on a pixel-by-pixel basis, in accordance with the magnitude of the gain.

11. A method for controlling an image capturing apparatus,
the image capturing apparatus comprising:
an image sensor including a plurality of pixels, each pixel being configured to include a sensor unit that outputs a signal pulse in response to a single photon being received, and a counter that counts the signal pulses and outputs a count value, and
the method comprising:
controlling a pulsewidth of the signal pulse in accordance with a magnitude of a gain with which the count value is multiplied,
wherein the pulsewidth of the signal pulses is controlled such that the pulsewidth in a case that the gain is relatively high is longer than the pulsewidth in a case that the gain is relatively low.

12. A method for controlling an image capturing apparatus,
the image capturing apparatus comprising:
an image sensor including a plurality of pixels, each pixel being configured to include a sensor unit that outputs a signal pulse in response to a single photon being received, a counter that counts the signal pulses and outputs a count value, and a counter controller that controls the counter to not count signal pulses in a predetermined period after the occurrence of the signal pulse, and
the method comprising:
controlling the predetermined period in accordance with a magnitude of a gain with which the count value is multiplied,
wherein the predetermined period is controlled such that the predetermined period in a case that the gain is relatively high is longer than the predetermined period in a case that the gain is relatively low.

* * * * *